(12) United States Patent
Hsueh et al.

(10) Patent No.: US 8,516,079 B2
(45) Date of Patent: *Aug. 20, 2013

(54) REMOTE DESKTOP CONTROL SYSTEM USING USB INTERFACE AND METHOD THEREOF

(75) Inventors: Chao-Hsuan Hsueh, Taipei (TW); Hsin-Mao Shen, Taipei (TW)

(73) Assignee: Aten International Co., Ltd., Shijr (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,439

(22) Filed: Oct. 9, 2009

(65) Prior Publication Data

US 2010/0077061 A1 Mar. 25, 2010

Related U.S. Application Data

(63) Continuation-in-part of application No. 12/237,549, filed on Sep. 25, 2008.

(51) Int. Cl.
*G06F 15/16* (2006.01)
*G06F 13/42* (2006.01)

(52) U.S. Cl.
USPC .......................... 709/219; 709/217; 710/105

(58) Field of Classification Search
USPC ................... 709/217, 219; 710/105
See application file for complete search history.

(56) References Cited

U.S. PATENT DOCUMENTS

| | | | |
|---|---|---|---|
| 5,758,125 A | 5/1998 | Misinai et al. | |
| 6,466,982 B1 * | 10/2002 | Ruberg | 709/227 |
| 6,557,170 B1 | 4/2003 | Wilder et al. | |
| 6,636,929 B1 | 10/2003 | Frantz et al. | |
| 6,732,159 B1 | 5/2004 | Levine et al. | |
| 6,894,906 B2 | 5/2005 | Sivertsen | |

(Continued)

FOREIGN PATENT DOCUMENTS

| | | |
|---|---|---|
| CN | 100470528 | 3/2009 |
| CN | 100478952 | 4/2009 |

(Continued)

OTHER PUBLICATIONS

Chinese Office Action, dated Dec. 3, 2010, in a counterpart Chinese patent application, No. CN 200910203065.5.

(Continued)

*Primary Examiner* — Umar Cheema
(74) *Attorney, Agent, or Firm* — Chen Yoshimura LLP

(57) ABSTRACT

A desktop sharing and remote control system where the server (the controlled computer) and the client (the controlling computer) are connected by a USB cable. Either the server or the client includes a connecting section, which includes a control unit (MCU) and two USB controllers. The MCU transfers data between the two USB controllers. The server-side USB controller emulates a USB CD-ROM/keyboard/mouse composite device; the client-side USB controller emulates a USB CD-ROM. The server continuously writes video data (desktop image) to the server-side emulated CD-ROM and the client continuously reads the data from the client-side emulated CD-ROM and applies it to its monitor. Keyboard and mouse data is transferred in the opposite direction via the client-side emulated CD-ROM and server-side emulated keyboard and mouse devices. The connecting section stores applications programs to be automatically executed by the server and client using auto-run functions of the emulated CD-ROMs to accomplish plug-and-play.

26 Claims, 5 Drawing Sheets

(56) References Cited

U.S. PATENT DOCUMENTS

| | | |
|---|---|---|
| 7,004,787 B2 | 2/2006 | Milan |
| 7,108,191 B2 | 9/2006 | Andrus |
| 7,114,018 B1 | 9/2006 | Maity et al. |
| 7,260,624 B2 | 8/2007 | Sivertsen |
| 7,330,919 B2 | 2/2008 | Zhang et al. |
| 7,367,513 B2 | 5/2008 | Andrus |
| 7,428,606 B2 | 9/2008 | Liu et al. |
| 7,454,490 B2 | 11/2008 | Sivertsen |
| 7,676,549 B2 | 3/2010 | McKeon et al. |
| 7,827,258 B1 | 11/2010 | Kalbarga |
| 7,917,674 B2 | 3/2011 | Lin et al. |
| 7,921,244 B2 | 4/2011 | Chang et al. |
| 8,099,535 B2 | 1/2012 | Cheng |
| 2003/0093599 A1 | 5/2003 | Lou et al. |
| 2004/0230708 A1 | 11/2004 | Juan |
| 2004/0230710 A1 | 11/2004 | Goodman |
| 2005/0007965 A1* | 1/2005 | Hagen et al. ........... 370/260 |
| 2005/0010699 A1 | 1/2005 | Hung et al. |
| 2005/0055690 A1 | 3/2005 | Cornillon et al. |
| 2005/0203997 A1 | 9/2005 | Sun |
| 2005/0223145 A1 | 10/2005 | Lin et al. |
| 2005/0275641 A1 | 12/2005 | Franz |
| 2006/0161617 A1* | 7/2006 | Zhong et al. ........... 709/203 |
| 2006/0236347 A1 | 10/2006 | Holovacs |
| 2006/0253639 A1 | 11/2006 | Lee et al. |
| 2007/0011334 A1 | 1/2007 | Higgins et al. |
| 2007/0050499 A1 | 3/2007 | Atherton et al. |
| 2007/0094422 A1 | 4/2007 | Huang |
| 2007/0136498 A1 | 6/2007 | Tseng et al. |
| 2007/0156710 A1 | 7/2007 | Kern et al. |
| 2007/0168481 A1 | 7/2007 | Lambert et al. |
| 2007/0198656 A1 | 8/2007 | Mazzaferri et al. |
| 2007/0214276 A1* | 9/2007 | Panabaker et al. ........ 709/230 |
| 2007/0261097 A1 | 11/2007 | Siegman et al. |
| 2007/0282748 A1 | 12/2007 | Saint Clair et al. |
| 2007/0285394 A1 | 12/2007 | Lee et al. |
| 2008/0005260 A1 | 1/2008 | Belimpasakis et al. |
| 2008/0005371 A1 | 1/2008 | Hill et al. |
| 2008/0005414 A1 | 1/2008 | Liu et al. |
| 2008/0062121 A1 | 3/2008 | Huang et al. |
| 2008/0129692 A1 | 6/2008 | Sween et al. |
| 2008/0155533 A1 | 6/2008 | Mittapalli et al. |
| 2008/0235596 A1 | 9/2008 | Bhogal et al. |
| 2008/0288677 A1 | 11/2008 | Kirshtein |
| 2009/0013056 A1 | 1/2009 | Weinstock et al. |
| 2009/0077222 A1 | 3/2009 | Shen et al. |
| 2009/0083453 A1 | 3/2009 | Hsueh et al. |
| 2009/0094672 A1 | 4/2009 | Bunger et al. |
| 2009/0112616 A1 | 4/2009 | Jung et al. |
| 2009/0193155 A1 | 7/2009 | Skillman et al. |
| 2009/0222739 A1 | 9/2009 | Schmieder et al. |
| 2009/0292999 A1* | 11/2009 | LaBine et al. ............ 715/740 |
| 2009/0300510 A1 | 12/2009 | Gantman et al. |
| 2009/0304011 A1 | 12/2009 | Smith |
| 2010/0011055 A1 | 1/2010 | Lin et al. |
| 2010/0030853 A1 | 2/2010 | Lin et al. |
| 2010/0100652 A1 | 4/2010 | Lin et al. |
| 2010/0325278 A1 | 12/2010 | Heim et al. |

FOREIGN PATENT DOCUMENTS

| | | |
|---|---|---|
| EP | 1515230 A2 | 3/2005 |
| JP | 2008217272 | 9/2008 |
| TW | 200424862 | 11/2004 |
| TW | I228659 | 3/2005 |
| TW | I241520 | 10/2005 |
| TW | M284064 | 12/2005 |
| TW | I286694 | 9/2007 |
| TW | 200912698 | 3/2009 |

OTHER PUBLICATIONS

European Search Report in related application EP 09 159 006.7, dated Sep. 23, 2009.
"Application Program Interface (API)". <http://searchexchange.techtarget.com/definition/application_program_interface>. Aug. 2000.
"ASIC (Application-Specific Integrated Circuit)". <http://searchcio-midmarket.techtarget.com/definition/ASIC>. Aug. 2000.
Chinese Office Action, dated Mar. 6, 2012, in a counterpart Chinese patent application, No. CN 201010192458.3.
Japanese Office Action, dated Apr. 24, 2012, in a counterpart Japanese patent application No. 2009-132506.
Chinese Office Action, dated Nov. 1, 2012, in a counterpart Chinese patent application, No. CN 201010192458.3.

* cited by examiner

REMOTE DESKTOP CONTROL SYSTEM USING USB INTERFACE AND METHOD THEREOF

This application is a continuation-in-part of U.S. application Ser. No. 12/237,549, filed 25 Sep. 2008, now pending, which is herein incorporated by reference in its entirety.

BACKGROUND OF THE INVENTION

1. Field of the Invention

This invention relates to a system which allows one computer to remotely control another computer, and in particular, it relates to such a graphical desktop sharing system using a USB (Universal Serial Bus) interface.

2. Description of the Related Art

Virtual Network Computing (VNC) is a graphical desktop sharing system which allows one computer (client) to remotely control another computer (server). The server and client computers are connected by a network. The keyboard and mouse data are transmitted from the client to the server, and the video signals representing the server desktop image are transmitted to the client and displayed on the client's monitor. Such a system may be used, for example, to allow IT and technical support personnel to control other users' computers remotely.

U.S. Patent Application Publication 2004/0230708 describes "an application method for universal serial bus (USB) file transfer cable. When USB file transfer cable is connected between two computers loaded with operating such systems as Window, Mac, Linux, etc., that support Mass Storage Class standard while the USB file transfer cable also supports Mass Storage Class, either computer can access system information provided in the USB file transfer cable. Since the application program is stored in the USB file transfer cable and the USB file transfer cable is simulated as an auto-run storage device, such as a floppy disc drive, a hard disc drive or a CD-ROM drive, etc., the USB file transfer cable in the present invention is capable of carrying out file transfers automatically without having to install drivers and programs. To users, the application method for USB file transfer cable offers plug and play capabilities as file transfers can be performed automatically between two computers without having to install drivers and programs in either computer." (Abstract.)

SUMMARY OF THE INVENTION

The present invention is directed to an apparatus and related a method of a graphical desktop sharing system that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

As embodied and broadly described, the present invention provides a server having functionality for facilitating remote control of the server by a client, which includes: a host communication controller; a first communication controller connected to the host communication controller, the first communication controller emulating a first mass storage device and one or more user input devices complying with a predetermined communication protocol; a second communication controller adapted for connecting to the client, the second communication controller emulating a second mass storage device complying with the predetermined communication protocol; a control circuit being coupled to and controlling the first and second communication controller, the control circuit transferring data between the first and second communication controllers; and a memory coupled to the control circuit, the memory storing a server-side application program and a client-side application program, the server-side application program and the client-side application program being different programs, wherein the control circuit transfers the server-side application program and the client-side application program to the first and second communication controllers, respectively. The server-side application program is configured to cause the server to transmit video data representing a desktop image of the server to the emulated first mass storage device and to receive user input device data from the emulated user input devices, and the client-side application program is configured to cause the client to transmit the user input device data to the emulated second mass storage device and to receive the video data from the emulated second mass storage device.

In another aspect, the present invention provides a client having functionality for facilitating remote control of a server by the client, which includes: a host communication controller; a first communication controller adapted for connecting to the server, the first communication controller emulating a first mass storage device and one or more user input devices complying with a predetermined communication protocol; a second communication controller connected to the host communication controller, the second communication controller emulating a second mass storage device complying with the predetermined communication protocol; a control circuit being coupled to and controlling the first and second communication controller, the control circuit transferring data between the first and second communication controllers; and a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller, respectively.

In another aspect, the present invention provides a method of remotely controlling a server by a client, the server including a host communication controller, a first communication controller, a second communication controller, a connector coupled to the second communication controller, a control circuit being coupled to and controlling the first and second communication controller, and a memory coupled to the control circuit, the memory storing a server-side application program and a client-side application program, the method including: (a) upon the server being initiated, the first communication controller emulating a first mass storage device and one or more user input devices complying with a predetermined communication protocol; (b) upon the connector being connected with the client, the second communication controller emulating a second mass storage device complying with the predetermined communication protocol; (c) the control circuit transferring the server-side application program and the client-side application program to the first and second communication controllers, respectively; (d) the first communication controller receiving video data representing desktop images from the host communication controller via the emulated first mass storage device; (e) the control circuit transferring the video data to the second communication controller; (f) the second communication controller outputting the video data to the client via the emulated second mass storage device; (g) the second communication controller receiving user input device data from the client via the emulated second mass storage device; (h) the control circuit transferring the user input device data to the first communication controller; and (i) the first communication controller outputting the user input device data to the host communication controller via the emulated user input devices.

In another aspect, the present invention provides a method of remotely controlling a server by a client, the client including a host communication controller, a first communication controller, a second communication controller connected to the host communication controller, a connector coupled to the first communication controller, a control circuit being coupled to and controlling the first and second communication controller, and a memory coupled to the control circuit, the memory storing a server-side application program and a client-side application program, the method including: (a) upon the connector being connected with the server, the first communication controller emulating a first mass storage device and one or more user input devices complying with a predetermined communication protocol; (b) upon the client being initiated, the second communication controller emulating a second mass storage device complying with the predetermined communication protocol; (c) the control circuit transferring the server-side application program and the client-side application program to the first and second communication controllers, respectively; (d) the first communication controller receiving video data representing desktop images from the server via the emulated first mass storage device; (e) the control circuit transferring the video data to the second communication controller; (f) the second communication controller outputting the video data to the host communication controller via the emulated second mass storage device; (g) the second communication controller receiving user input device data from the host communication controller via the emulated second mass storage device; (h) the control circuit transferring the user input device data to the first communication controller; and (i) the first communication controller outputting the user input device data to the server via the emulated user input devices.

It is to be understood that both the foregoing general description and the following detailed description are exemplary and explanatory and are intended to provide further explanation of the invention as claimed.

BRIEF DESCRIPTION OF THE DRAWINGS

FIG. 4 illustrates a process carried out on the server side and FIG. 5 illustrates a process carried out on the server side.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
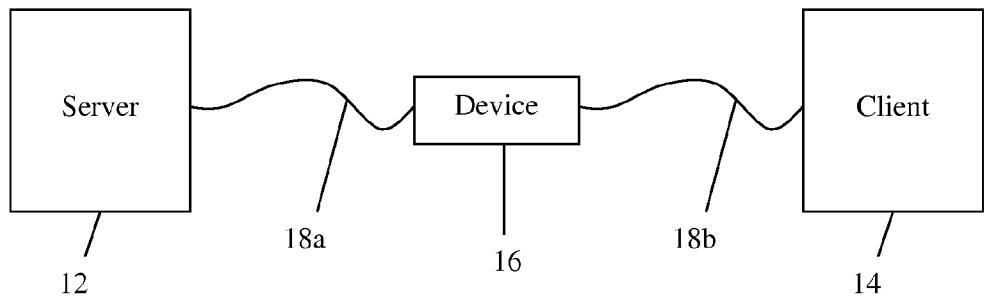
FIG. 1 illustrates a configuration of the graphical desktop sharing system according to an embodiment of the present invention.

According to embodiments of the present invention, in a graphical desktop sharing and remote control system, the server (the computer that is being controlled and is sharing its desktop image) and the client (the computer that is viewing the desktop image of the server and transmitting keyboard and mouse signals to control the server) are connected by a connecting device (cable) which has USB connectors at both ends. The connecting device facilitates the desktop sharing and remote control between the server and the client. FIG. 1 illustrates the overall configuration of the system. A server computer 12 and a client computer 14 are connected to a connecting device 16 by two USB cables 18a and 18b, respectively. The connecting device 16 typically has a small form factor. The USB cables 18a and 18b may be formed integrally with the body of the device 16, or they may be physically separate cables plugged into respective connectors on the body of the device 16, or a combination thereof.

Figure 2:
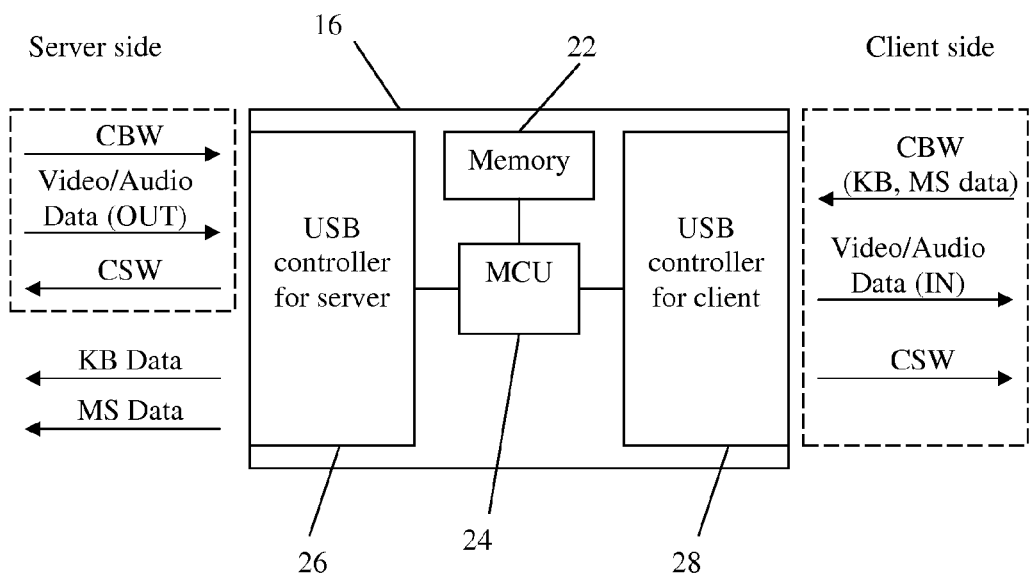
FIG. 2 illustrates the structure of a connecting device for remote desktop control according to an embodiment of the present invention.

The structure of the connecting device 16 is illustrated in FIG. 2. The device 16 includes a memory 22, a control circuit such as a microcontroller unit MCU 24, a first communication controller, the USB controller for server 26, and a second communication controller, the USB controller for client 28. The USB cables 18a and 18b are connected to the USB controller for server 26 and USB controller for client 28, respectively. The memory 22 stores firmware for the MCU 24 and the USB controllers 26 and 28, as well as remote control programs to be executed (preferably automatically executed) by the server 12 and the client 14, respectively, as will be described in more detail later. The MCU 24 controls the USB controllers 26 and 28. It also transfers data between the USB controller for server 26 and the USB controller for client 28, and processes keyboard and mouse data from the client as will be described in more detail later. The USB controllers 26 and 28 communicate with the server 12 and client 14 using the USB protocol.

The USB controller for client 28 emulates a USB CD-ROM device for the client 14. In other words, to the client 14, the device 16 appears to be a CD-ROM communicating with the client using the USB protocol. For example, when the device 16 is plugged in, the "my computer" window on the client will show an additional CD-ROM device, and the "device manager" window will show an additional USB mass storage device. Similarly, the USB controller for server 26 emulates a USB CD-ROM/keyboard/mouse composite device for the server 12. In other words, to the server 12, the device 16 appears to be a CD-ROM/keyboard/mouse composite device communicating with the server using the USB protocol. For example, when the device 16 is plugged in, the "my computer" window on the server will show an additional CD-ROM device, and the "device manager" window will show an additional USB mass storage device, and additional keyboard, and an additional mouse. Although in this example the USB controller for server 26 emulates both a keyboard device and a mouse device, it may alternatively emulate only a keyboard device or only a mouse device, which may be individually or collectively referred to as a user input device.

Although a CD-ROM is described as an example, the USB controllers 26 and 28 can also emulate other mass storage devices complying with the USB Mass Storage Class standard, such as DVD-ROMs, flash drives, hard disk drives, floppy disk drives, etc. CD-ROMs are preferred as the emulated devices because they provide convenient auto-run functions.

Because the emulated devices (USB CD-ROM, USB CD-ROM/keyboard/mouse) are standard devices, computers running popular operating systems such as Window, Mac, Linux, etc., can use their existing drivers to communicate with the connecting device 16 without requiring any special driver to be installed. Methods for emulating a USB CD-ROM device or a USB CD-ROM/keyboard/mouse composite device are known in the art and more detailed descriptions are omitted here.

The emulated CD-ROM device for the server contains a server-side remote control program to be executed by the server 12. The emulated CD-ROM preferably has an auto-run function, which may be implemented by providing auto-run files on the emulated CD-ROM. Thus, the server-side remote control program on the emulated CD-ROM will be automatically executed by the server when the device 16 is plugged into the server 12, and the user does not need to perform a separate program installation step. The server-side remote control program instructs the server 12 to continuously transfer video (desktop image) and audio data generated by the server to the connecting device 16 by writing the video and audio data to the emulated CD-ROM device, as well as to continuously read the keyboard and mouse data from the emulated keyboard and mouse devices. The server 12 uses the keyboard and mouse data to control its functions.

Similarly, the emulated CD-ROM device for the client contains a client-side remote control program to be executed by the client 14, and also contains auto-run files to cause the client to automatically execute the client-side remote control program. The client-side remote control program instructs the client to continuously receive video and audio data from the connecting device 16 by reading the video and audio data from the emulated CD-ROM device. The client 14 applies the video and audio data to its monitor and speaker. In a preferred embodiment, the server's desktop is displayed on the client's desktop as a window (referred to here as the remote control window). The client receives information from the server regarding the resolution of the server's desktop, and the client draws the window and its content based on that information. The remote control window may be dragged (moved) and resized. In a preferred embodiment, the client-side remote control program creates the remote control window, but the actual functions of drawing and managing the window (dragging, resizing, etc.) are performed by the operating system of the client computer. Alternatively, these functions can be performed by the application software, depending on different programming methods. The client-side remote control program also instructs the client to obtain keyboard and mouse events that are intended for the server. For example, the client can determine whether a keyboard or mouse event is intended for controlling the server computer based on whether the cursor is located within the remote control window and/or whether that window is the top window on the client's desktop. This is also a function of the client's operating system. If the keyboard or mouse event is intended for the server, the client continuously transfers the keyboard and mouse data to the connecting device 16 in a manner described later. As the video and audio data are continuously transferred from the server 12 via the connecting device 16 to the client 14, and the keyboard and mouse data are continuously transferred in the opposite direction, graphical desktop sharing and remote control of the server is accomplished.

The server-side and client-side remote control programs and the auto-run files are stored in the memory 22, and are transferred to the USB controller for server and the USB controller for client, respectively, by the MCU 24.

The data transfer between the server 12 and the connecting device 16 and between the client 14 and the connecting device 16 is illustrated in more detail in FIG. 2. Bulk-only transport between the host computer (either server or client) and the emulated CD-ROM device has three stages. First, the host computer transmits an OUT packet called Command Block Wrapper (CBW) to the CD-ROM. The CBW contains a SCSI command, e.g. a Send_data command in the server's CBW or a Read_data command in the client's CBW. Then bulk data (if any) is transferred, as OUT data in the case of the server and as IN data in the case of the client. After the data transfer stage, the host computer sends an IN packet, and receives a Command Status Wrapper (CSW) packet from the USB controller which indicates whether the data transfer was successful. Within the connecting device 16, the MCU 24 transfers the bulk data from the USB controller for server 26 to the USB controller for client 28.

In the desktop sharing and remote control system according to the present invention, the video and audio data from the server 12 to the client 14 is transferred as bulk data via the emulated CD-ROM devices in the manner described above. The keyboard (KB) and mouse (MS) data from the client 14 to the server 12, on the other hand, are not transferred as bulk data. Rather, as shown in FIG. 2, the keyboard and mouse data is packaged into the CBW sent by the client 14 to the USB controller for client 28. The MCU 24 processes the CBW received by the USB controller for client 28 to extract the keyboard and mouse data, and transfers the data to the USB controller for server 26. The USB controller for server 26 outputs the keyboard and mouse data to the server 12 via the respective endpoints of the emulated USB keyboard and mouse devices.

Other information that needs to be transmitted from the client to the server, such as user interface configuration information, hardware information, etc., can be transmitted using keyboard hotkeys. For example, a function key may be used to turn on and off the audio. When the user at the client side pressed the function key, the hotkey signal is transmitted in the same matter as other keyboard data. The server-side remote control program on the server, upon receiving the hotkey data, responds accordingly.

Figure 3:
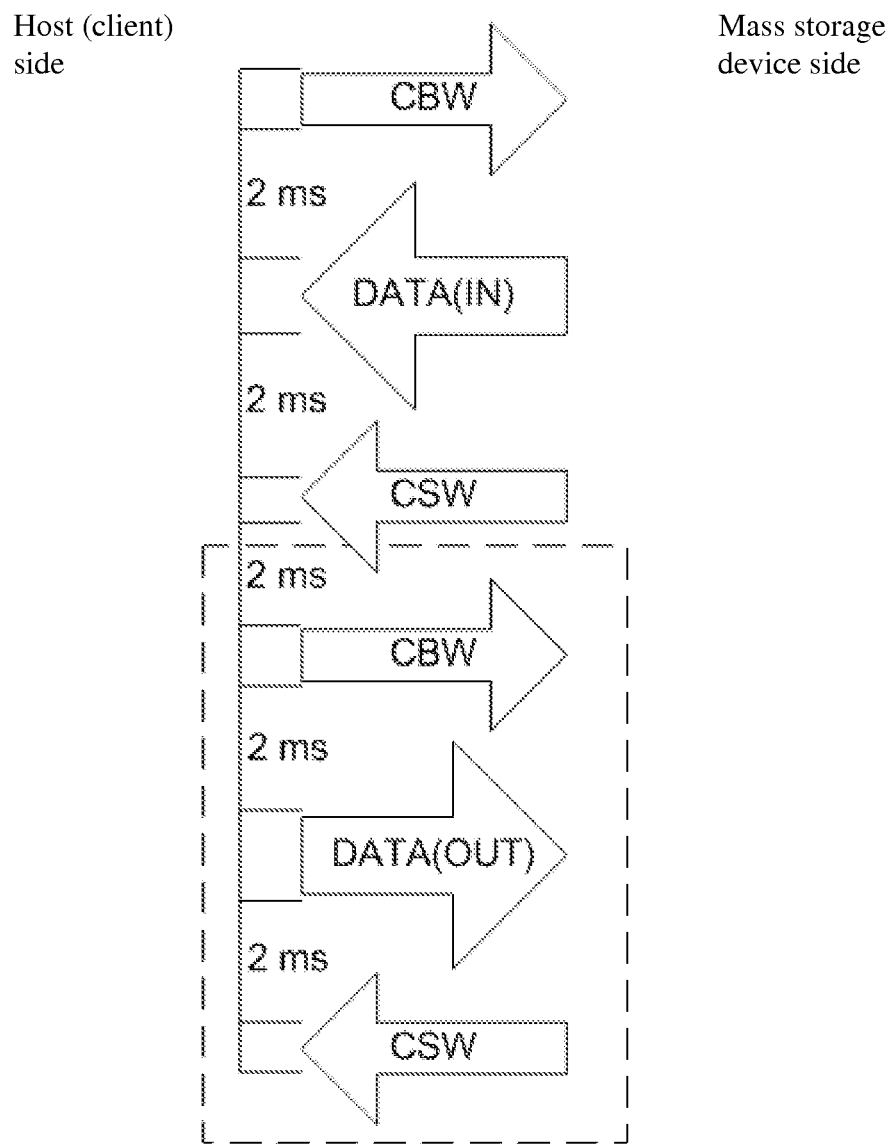
FIG. 3 illustrates bulk data transfer between a host computer and a mass storage device.

Transferring the keyboard and mouse data along with the SCSI command in the CBW in the manner described above increases the bulk data transfer efficiency. The operating systems of the server and client typically have predetermined bandwidth for transferring data to and from a USB mass storage device, and can only read data or write data at a given time (i.e. data can flow in one direction at a given time). If the video and audio data (from the server to the client) and the keyboard and mouse data (from the client to the server) are both transferred as bulk data, the transfer of the relatively large volume of video and audio data in one direction will be broken up by the transfer of the relatively small volume of keyboard and mouse data in the other direction. This is inefficient because in the bulk-only data transport, each stage (CBW, data, CSW) is separated from the previous stage by two Start of Frame (SOF) (approximately 2 ms with USB 1.1 and 250 us with USB 2.0) (refer to FIG. 3). Thus, even if only a small amount of data (e.g. keyboard and mouse data) needs to be transmitted, at least 6 ms of time is required. Considering the fact that within the equivalent time of an SOF several Kbytes of data bulk can be transferred (approximately 3 KB in 2 ms under USB 1.1 and 15 KB in 250 us under USB 2.0), the overhead caused by breaking up of data transfer is significant. As a result, the transfer efficiency for the video and audio data will be greatly impacted by the transfer of the keyboard and mouse data. In FIG. 3, the events in the dashed line box represent transfer of keyboard and mouse data from the client to the emulated CD-ROM device. In a preferred embodiment of the present invention, these events do not occur, and bulk data is almost always transferred in one direction (server to client). As a result, maximum bandwidth of the emulated CD-ROM device is available for transferring video and audio data from the server to the client.

In an alternative embodiment, the keyboard and mouse data is transmitted as bulk data in a manner similar to the video and audio data but in the opposite direction. Such an alternative embodiment will not enjoy the advantages described above.

Figure 4:
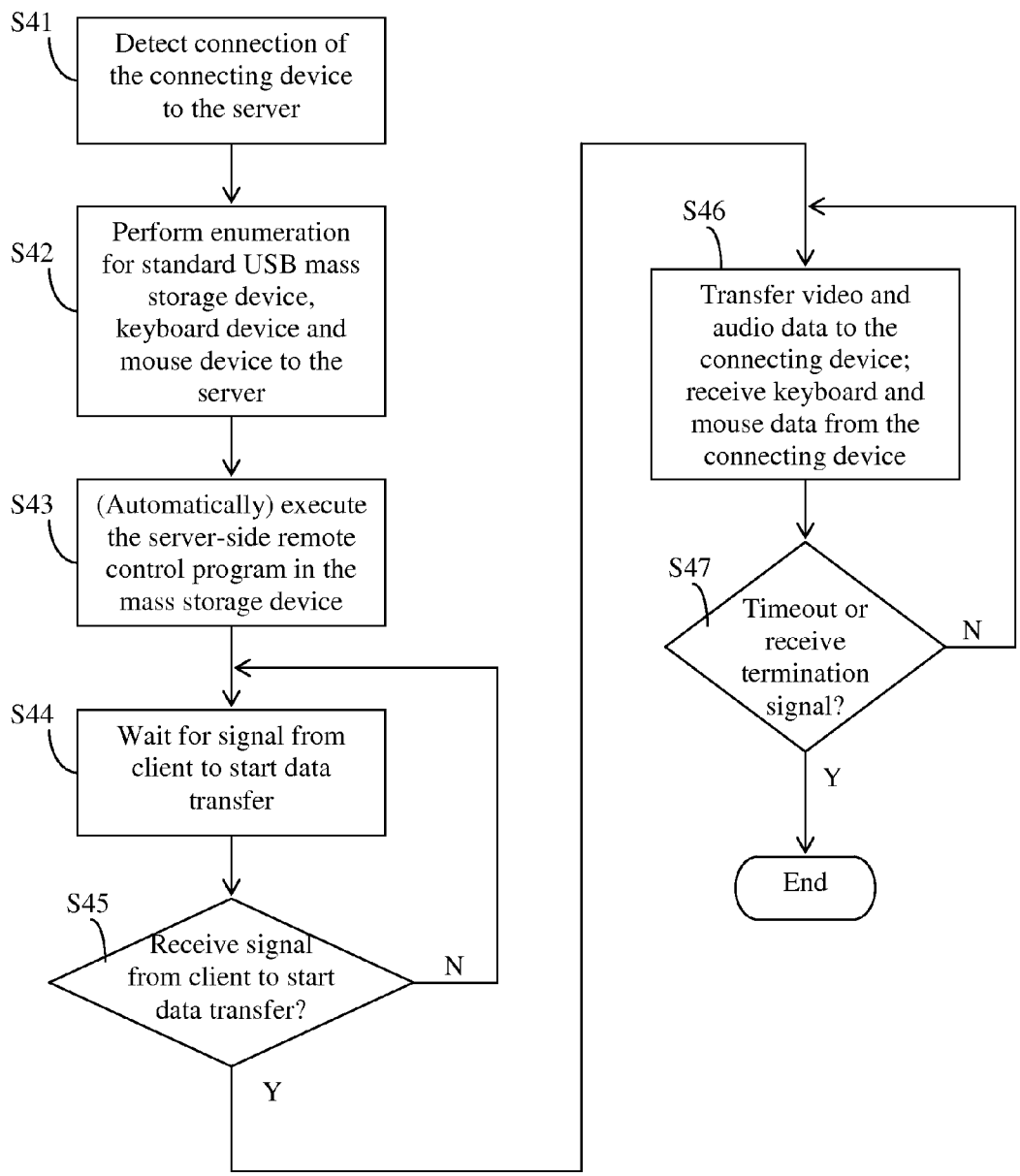
FIGS. 4 and 5 illustrate a process for desktop sharing and remote control of the server using the connecting device according to an embodiment of the present invention.
Figure 5:
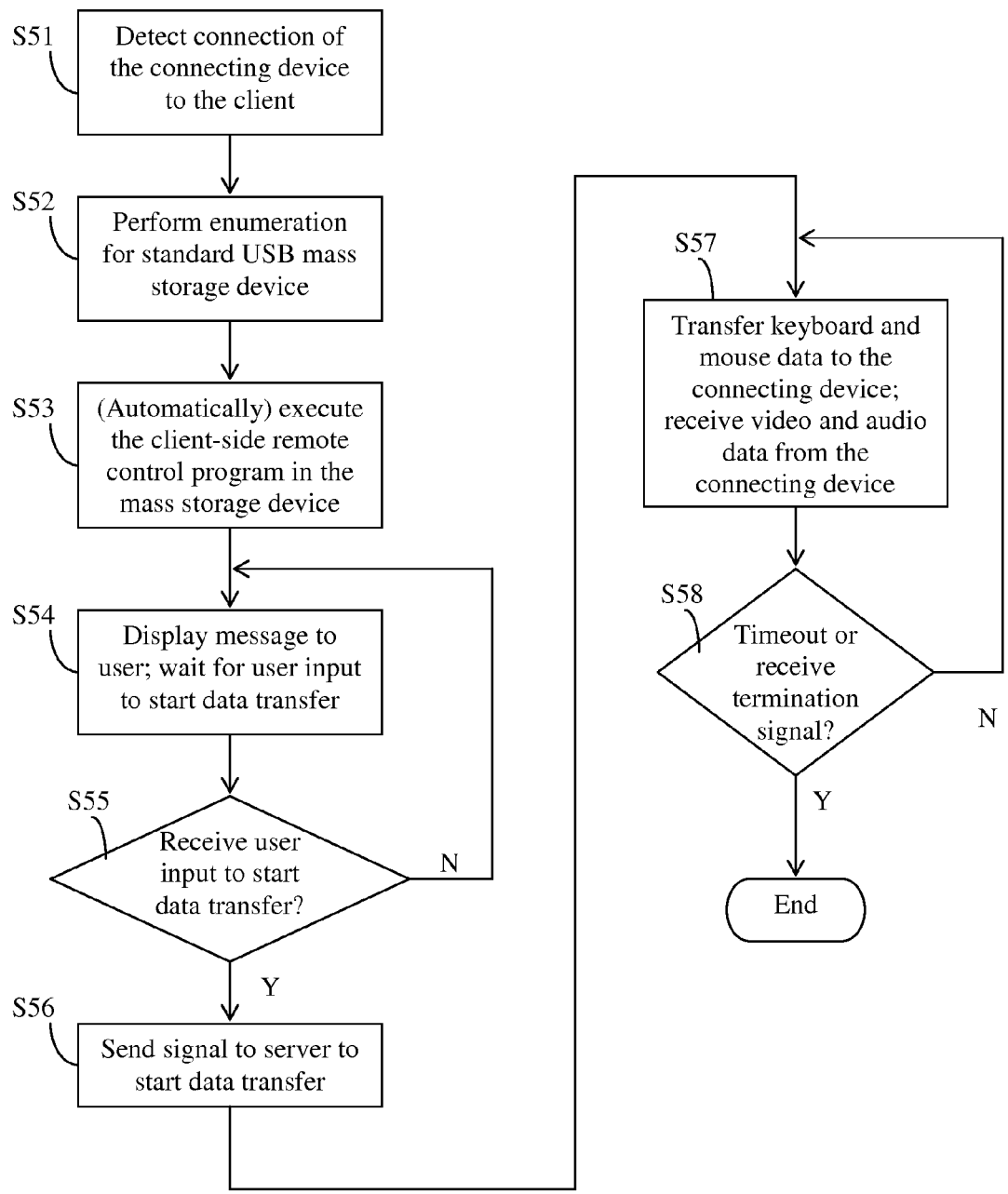

FIGS. 4 and 5 are flow diagrams illustrating a process for desktop sharing and remote control using the connecting device 16. The process in FIG. 4 is carried out on the server side and the process in FIG. 5 is carried out on the client side. As shown in FIG. 4, when the connecting device 16 is connected to the server 12, the server (the USB host) detects such an event (step S41), the server cooperates with the device 16 to perform USB device enumeration for the standard USB mass storage device, keyboard device and mouse device (step S42). The USB controller for server 26 presents the auto-run file and the server-side remote control program on the emulated mass storage device, and the server 12 automatically executes the server-side remote control program (step S43). Alternatively, if an auto-run file is not stored in the emulated mass storage device, a user action will be performed to execute the server-side remote control program. Under the control of the server-side remote control program, the server 12 waits for a signal from the client 14 (in the form of a keyboard or mouse command from the emulated keyboard or mouse device) to start data transfer (step S44). If such a signal is received ("Y" in step S45), the desktop sharing and remote control communication has been established. The server 12 starts to execute the server data transfer functions, including transferring video and audio data to the connecting device, and receiving keyboard and mouse data from the connecting device (step S46). The server also performs its other functions based on the received keyboard and mouse data. The server continues to perform these functions (return to step S46 if "N" in step S47) until timeout (e.g., the connecting device is unplugged) or a termination signal is received from the client or from a user input device on the server ("Y" in step S47).

As shown in FIG. 5, when the connecting device 16 is plugged into the client 14 (USB host) (step S51), the client 14 cooperates with the device 16 to perform USB device enumeration for the standard USB mass storage device (step S52). The USB controller for client 28 presents the auto-run file and the client-side remote control program on the emulated mass storage device, and the client 14 automatically executes the client-side remote control program (step S53). Alternatively, if an auto-run file is not stored in the emulated mass storage device, a user action will be performed to execute the client-side remote control program. Under the control of the client-side remote control program, the client 14 displays a message to the user, such as a "start" button on the screen, and waits for a user input to start data transfer (step S54). If the user input is received ("Y" in step S55), the client 14 sends a start signal to the server 12 (e.g., by sending a keyboard or mouse command via the connecting device 16) (step S56). The client also starts to execute the client data transfer functions, including transferring keyboard and mouse data to the connecting device 16 in the manner described earlier, and receiving video and audio data from the device 16 (step S57). The client also applies the received video and audio signals to its monitor and speaker. The client 14 continues to perform these functions (return to step S57 if "N" in step S58) until timeout or a termination signal is received from the user ("Y" in step S58).

Figure 6A:
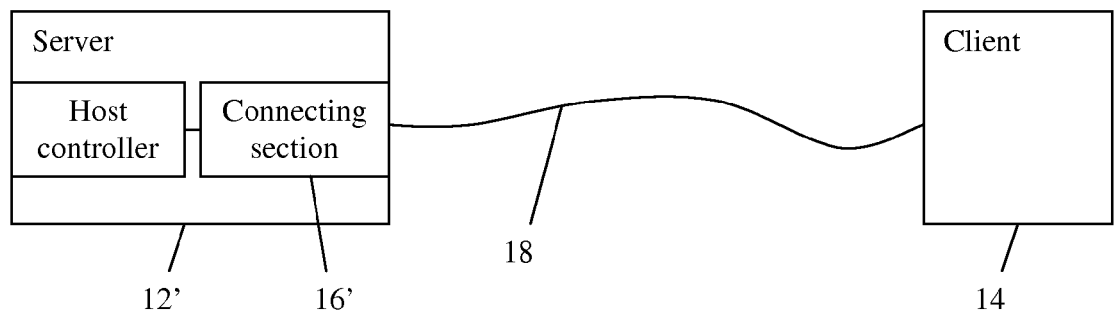
FIGS. 6A and 6B illustrate configurations of two graphical desktop sharing systems according to alternative embodiments of the present invention.
Figure 6B:
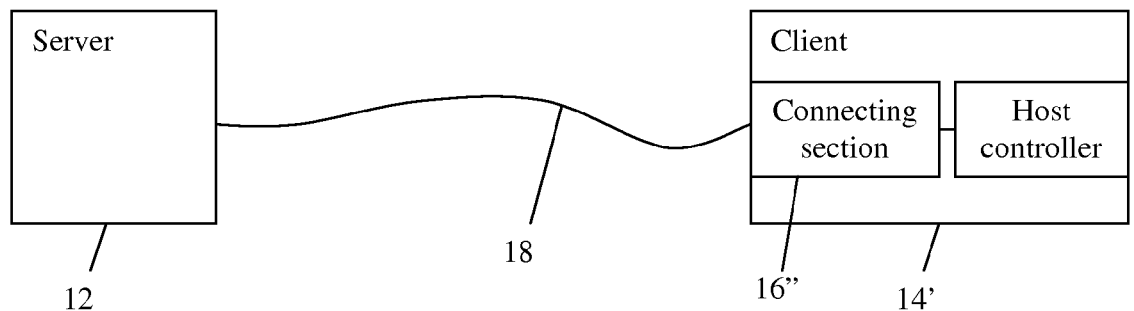

FIGS. 6A and 6B illustrate two alternative embodiments of the present invention. In the system shown in FIG. 6A, a server 12' is connected to a client 14 by a USB cable 18. The client 14 is identical to the client 14 in FIG. 1. The structure and function of the connecting device 16 shown in FIGS. 1 and 2 are now incorporated into the server 12', as schematically shown in FIG. 6A as a connecting section 16' inside the server 12'. The server 12' has other components typically found in a conventional server computer, such as a CPU, a USB host controller, etc. The connecting section 16' has the same components as the device 16 shown in FIG. 2; the USB controller 26 of the connecting section 16' is connected to the USB host controller or CPU (Central processing unit) or bus of the server 12', and the USB controller 28 of the connecting section 16' is connected to the client 14. The connecting section 16' may be implemented as, for example, a chip or chipset on the motherboard of the server 12' or on another circuit board module connected to the motherboard.

The functions of the connecting section 16' are identical to the functions of the connecting device 16 as shown in FIGS. 3-5 and described in the accompanying descriptions, except for the following difference: Unlike the connecting device 16 of FIG. 1, the connecting section 16' is always physically connected to the USB host controller of the server after it is installed. Therefore, steps S41-S43 in FIG. 4 (the server side process) are performed during server initiation (e.g. power on), rather than when a physical connection with the server is detected.

In the system shown in FIG. 6B, a server 12 is connected to a client 14' by a USB cable 18. The server 12 is identical to the server 12 in FIG. 1. The structure and function of the connecting device 16 shown in FIGS. 1 and 2 are now incorporated into the client 14', as schematically shown in FIG. 6B as a connecting section 16" inside the client 14'. The client 14' has other components typically found in a conventional client computer, such as a CPU, a USB host controller, etc. The connecting section 16" has the same components as the device 16 shown in FIG. 2; the USB controller 28 of the connecting section 16" is connected to the USB host controller or CPU (Central processing unit) or bus of the client 14', and the USB controller 26 of the connecting section 16" is connected to the server 12. The connecting section 16" may be implemented as, for example, a chip or chipset on the motherboard of the client 14' or on another circuit board module connected to the motherboard.

The functions of the connecting section 16" are identical to the functions of the connecting device 16 as shown in FIGS. 3-5 and described in the accompanying descriptions, except for the following difference: Unlike the connecting device 16 of FIG. 1, the connecting section 16" is always physically connected to the USB host controller of the client after it is installed. Therefore, steps S51-S53 in FIG. 5 (the client side process) are performed during client initiation (e.g. power on), rather than when a physical connection with the client is detected.

By using the client and server system shown in FIG. 6A or 6B, the client 14/14' can display the desktop images of the server 12'/12 and/or play audio signals from the server 12'/12, and can control the server 12'/12 using the keyboard and mouse of the client 14/14'. Further, the client 14/14' and server 12'/12 can transfer files between them.

In one embodiment, a connecting device including a host communication controller, a first communication controller, a second communication controller, a control circuit and a memory is disposed on a motherboard or a circuit board module connected to the motherboard in the sever or client.

In one embodiment, the present invention provides a method of remotely controlling a server by a client, the server including a host communication controller, a first communication controller, a second communication controller, a connector coupled to the second communication controller, a control circuit being coupled to and controlling the first and second communication controller, and a memory coupled to the control circuit, the memory storing a server-side application program and a client-side application program, the method including: (a) upon the server being initiated, the first communication controller emulating a first mass storage device and one or more user input devices complying with a predetermined communication protocol; (b) upon the connector being connected with the client, the second communication controller emulating a second mass storage device complying with the predetermined communication protocol; (c) the control circuit transferring the server-side application program and the client-side application program to the first and second communication controllers, respectively; (d) the first communication controller receiving video data representing desktop images from the host communication controller via the emulated first mass storage device; (e) the control circuit transferring the video data to the second communication controller; (f) the second communication controller outputting the video data to the client via the emulated second mass storage device; (g) the second communication controller receiving user input device data from the client via the emulated second mass storage device; (h) the control circuit transferring the user input device data to the first communication controller; and (i) the first communication controller outputting the user input device data to the host communication controller via the emulated user input devices.

In another embodiment, the present invention provides a method of remotely controlling a server by a client, the client including a host communication controller, a first communication controller, a second communication controller connected to the host communication controller, a connector coupled to the first communication controller, a control circuit being coupled to and controlling the first and second communication controller, and a memory coupled to the control circuit, the memory storing a server-side application program and a client-side application program, the method including: (a) upon the connector being connected with the server, the first communication controller emulating a first mass storage device and one or more user input devices complying with a predetermined communication protocol; (b) upon the client being initiated, the second communication controller emulating a second mass storage device complying with the predetermined communication protocol; (c) the control circuit transferring the server-side application program and the client-side application program to the first and second communication controllers, respectively; (d) the first communication controller receiving video data representing desktop images from the server via the emulated first mass storage device; (e) the control circuit transferring the video data to the second communication controller; (f) the second communication controller outputting the video data to the host communication controller via the emulated second mass storage device; (g) the second communication controller receiving user input device data from the host communication controller via the emulated second mass storage device; (h) the control circuit transferring the user input device data to the first communication controller; and (i) the first communication controller outputting the user input device data to the server via the emulated user input devices.

In the preferred embodiment described above, it is described that the emulated CD-ROM device for the server contains a server-side remote control program to be executed by the server 12, and the emulated CD-ROM device for the client contains a client-side remote control program to be executed by the client 14. These programs are transferred to the server and the client, respectively, from the respective emulated CD-ROM. The server-side remote control program and the client-side remote control program are different programs in that they cause their hosts (server and client) to perform different functions. However, those skilled in the art will recognize that it is possible to provide a single application program that contains code of both the server-side remote control program and the client-side remote control program, where the single application program has different modes to be executed by the server and the client. Various methods may be used to cause the server to run the server mode and the client to run the client mode. Those skilled in the art will recognize that this alternative implementation has the same effect as providing two different application programs for the server and the client. Therefore, the expression "the server-side application program and the client-side application programs being different programs" should be considered to broadly cover this alternative implementation in addition to the preferred embodiments.

For example, one way to cause the server and client to run different modes is to provide a process in the single application program to check a description or name of the enumerated USB device, such as the PID or a string descriptor of the USB device. The MCU controls the USB device controller for server and the USB device controller for client to enumerate USB devices with the appropriate PIDs or descriptors. When single application program starts, it will obtain this description from the USB device, and determine whether to run the server mode or the client mode based on the obtained information.

Although USB is used in the above descriptions as the interface and communication protocol between the server, the connecting device and the client, the invention may be implemented using other standard interfaces and communication protocols, such as Firewire®, etc., including those that may come into existence in the future. Preferably, the protocol should be widely supported by a large number of computers used at the time. Further, the server and the client may be notebook computers, or can have external keyboard, mouse, monitor, microphone, speakers, touch panel display, etc. The server and the client may also be personal digital assistants, cellular phones, etc. The server and client may have the same or different operating systems of communication platforms.

Embodiments of the present invention provide a graphical desktop sharing system that does not require special driver programs and application software to be pre-installed on the server and client computers, and has a high transmission bandwidth for video and audio data that are not affected by the transmission of keyboard and mouse data.

It will be apparent to those skilled in the art that various modification and variations can be made in the graphical desktop sharing and remote control system method and apparatus of the present invention without departing from the spirit or scope of the invention. Thus, it is intended that the present invention cover modifications and variations that come within the scope of the appended claims and their equivalents.

What is claimed is:

1. A server having functionality for being remotely controlled by a client, comprising:
   a host communication controller;
   a first communication controller connected to the host communication controller, the first communication controller being detected connection to the server and emulating a first mass storage device and one or more user input devices complying with a predetermined communication protocol during a server initiation, and transmitting a user input device data to control the server via the at least one emulated user input device that provides keystroke data or cursor data or both as the user input device data input by the client, wherein the first communication controller transmits the user input device data in one direction and receives video data representing a desktop image of the server in the opposite direction by emulating the at least one emulated user input device and the emulated first mass storage device;
   a second communication controller configured for connecting to the client, the second communication controller emulating a second mass storage device complying with the predetermined communication protocol for receiving the user input device data from the client;
   a control circuit being coupled to and controlling the first and second communication controllers, the control circuit transferring the user input device data between the first and second communication controllers; and
   a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively;
   wherein the control circuit transfers the video data representing the desktop image of the server to the second communication controller, the second communication controller outputs the video data representing the desktop image of the server to the client via the emulated second mass storage device, the second communication controller receives the user input device data from the client via the emulated second mass storage device, the control circuit transfers the user input device data to the first communication controller, the first communication controller outputs the user input device data to the server via the at least one emulated user input device.

2. The server of claim 1, wherein the server-side application program is configured to cause the host communication controller to transmit video data representing the desktop image of the server to the emulated first mass storage device and to receive user input device data from the emulated user input devices.

3. The server of claim 1, wherein the client-side application program is configured to cause the client to transmit the user input device data to the emulated second mass storage device and to receive the video data from the emulated second mass storage device.

4. The server of claim 1, wherein the predetermined communication protocol is a Universal Serial Bus (USB) protocol, and the first and second communication controllers are USB controllers.

5. The server of claim 1, wherein the emulated first and second mass storage devices are CD-ROM devices.

6. The server of claim 5,
   wherein the memory further stores first and second auto-run files,
   wherein the control circuit transfers the first and second auto-run files to the first and second communication controllers, respectively,
   wherein the first communication controller presents the first auto-run file and the server-side application program on the first emulated CD-ROM device, and
   wherein the second communication controller presents the second auto-run file and the client-side application program on the second emulated CD-ROM device.

7. The server of claim 1, wherein the server-side application program is configured to cause the host communication controller to execute a process for transferring the video data representing the desktop image of the server to the emulated first mass storage device including:
   transmitting a first command packet containing a send data command to the emulated first mass storage device;
   transmitting the video data representing the desktop image of the server to the emulated first mass storage device; and receiving a first status packet from the emulated first mass storage device; and
   wherein the client-side application program is configured to cause the client to execute a process for receiving the video data representing the desktop image of the server from the emulated second mass storage device including:
      transmitting a second command packet containing a read data command to the emulated second mass storage device;
      receiving the video data representing the desktop image of the server from the emulated second mass storage device; and
      receiving a second status packet from the emulated second mass storage device.

8. The server of claim 7, wherein client-side application program is further configured to cause the client to execute a process for transmitting the user input device data to the emulated second mass storage device including:
   transmitting the user input device data in the second command packet to the emulated second mass storage device;
   wherein the control circuit processes the second command packet to extract the user input device data and transfers the extracted data to the first communication controller;
   wherein the first communication controller outputs the user input device data via the emulated user input devices.

9. The server of claim 1, further comprising:
   a circuit board on which the host communication controller, the first and second communication controllers, the control circuit and the memory are disposed.

10. A client having functionality for remotely controlling a server, comprising:
    a host communication controller;
    a first communication controller configured for connecting to the server, the first communication controller emulating a first mass storage device and one or more user input devices complying with a predetermined communication protocol, and transmitting a user input device data to control the server via the at least one emulated user input device that provides keystroke data or cursor data or both as the user input device data input by the client, wherein the first communication controller transmits the user input device data in one direction and receives the video data representing the desktop image of the server in the opposite direction by emulating the at least one emulated user input device and the emulated first mass storage device;

a second communication controller connected to the host communication controller, the second communication controller being detected connection to the client and emulating a second mass storage device complying with the predetermined communication protocol for receiving the user input device data from the client during a client initiation;

a control circuit being coupled to and controlling the first and second communication controllers, the control circuit transferring the user input device data between the first and second communication controllers; and a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively;

wherein the control circuit transfers the video data representing the desktop image of the server to the second communication controller, the second communication controller outputs the video data representing the desktop image of the server to the client via the emulated second mass storage device, the second communication controller receives the user input device data from the client via the emulated second mass storage device, the control circuit transfers the user input device data to the first communication controller, the first communication controller outputs the user input device data to the server via the at least one emulated user input device.

11. The client of claim 10, wherein the server-side application program is configured to cause the server to transmit video data representing the desktop image of the server to the emulated first mass storage device and to receive user input device data from the emulated user input devices.

12. The client of claim 10, wherein the client-side application program is configured to cause the host communication controller to transmit the user input device data to the emulated second mass storage device and to receive the video data from the emulated second mass storage device.

13. The client of claim 10, wherein the predetermined communication protocol is a Universal Serial Bus (USB) protocol, and the first and second communication controllers are USB controllers.

14. The client of claim 10, wherein the emulated first and second mass storage devices are CD-ROM devices.

15. The client of claim 14,
wherein the memory further stores first and second auto-run files,
wherein the control circuit transfers the first and second auto-run files to the first and second communication controllers, respectively,
wherein the first communication controller presents the first auto-run file and the server-side application program on the first emulated CD-ROM device, and
wherein the second communication controller presents the second auto-run file and the client-side application program on the second emulated CD-ROM device.

16. The client of claim 10, wherein the server-side application program is configured to cause the server to execute a process for transferring the video data to the emulated first mass storage device including:
transmitting a first command packet containing a send data command to the emulated first mass storage device;
transmitting the video data to the emulated first mass storage device; and receiving a first status packet from the emulated first mass storage device; and
wherein the client-side application program is configured to cause the client to execute a process for receiving the video data from the emulated second mass storage device including:
transmitting a second command packet containing a read data command to the emulated second mass storage device;
receiving the video data from the emulated second mass storage device; and
receiving a second status packet from the emulated second mass storage device.

17. The client of claim 16, wherein client-side application program is further configured to cause the host communication controller to execute a process for transmitting the user input device data to the emulated second mass storage device including:
transmitting the user input device data in the second command packet to the emulated second mass storage device;
wherein the control circuit processes the second command packet to extract the user input device data and transfers the extracted data to the first communication controller;
wherein the first communication controller outputs the user input device data via the emulated user input devices.

18. The client of claim 10, further comprising: a circuit board on which the host communication controller, the first and second communication controllers, the control circuit and the memory are disposed.

19. A method of remotely controlling a server by a client, the server including a host communication controller, a first communication controller connected to the host communication controller, a second communication controller, a connector coupled to the second communication controller, a control circuit being coupled to and controlling the first and second communication controllers, and a memory coupled to the control circuit, the memory storing a server-side application program and a client-side application program, the method comprising:
(a) upon the server being initiated, the first communication controller being detected connection to the server and emulating a first mass storage device and one or more user input devices complying with a predetermined communication protocol, the emulated user input devices providing keystroke data or cursor data or both as a user input device data input by the client;
(b) upon the connector being connected with the client, the second communication controller emulating a second mass storage device complying with the predetermined communication protocol for receiving the user input device data from the client;

(c) the control circuit transferring the server-side application program and the client-side application program to the first and second communication controllers, respectively;

(d) the first communication controller receiving video data representing desktop images from the host communication controller via the emulated first mass storage device;

(e) the control circuit transferring the video data representing the desktop images to the second communication controller;

(f) the second communication controller outputting the video data representing the desktop images to the client via the emulated second mass storage device;

(g) the second communication controller receiving the user input device data from the client via the emulated second mass storage device;

(h) the control circuit transferring the user input device data to the first communication controller; and (i) the first communication controller outputting the user input device data to the host communication controller via the emulated user input devices;

wherein the first communication controller transmits the user input device data in one direction and receives the video data representing the desktop images in the opposite direction by emulating the at least one emulated user input device and the emulated first mass storage device.

20. The method of claim 19, wherein the memory further stores first and second auto-run files, the method further comprising:

(j) the control circuit transferring the first and second auto-run files to the first and second communication controllers, respectively;

(k) the first communication controller presenting the first auto-run file and the server-side application program on the first emulated CD-ROM device; and (l) the second communication controller presenting the second auto-run file and the client-side application program on the second emulated CD-ROM device, wherein steps (j) through (l) are performed before steps (d) through (i).

21. A method of remotely controlling a server by a client, the client including a host communication controller, a second communication controller connected to the host communication controller, a first communication controller, a connector coupled to the first communication controller, a control circuit being coupled to and controlling the first and second communication controllers and a memory coupled to the control circuit, the memory storing a client-side application program and a server-side application program, the method comprising:

(a) upon the client being initiated, the second communication controller being detected connection to the client and emulating a second mass storage device complying with a predetermined communication protocol;

(b) upon the connector being connected with the server, the first communication controller emulating a first mass storage device and one or more user input devices complying with a predetermined communication protocol, the emulated user input devices providing keystroke data or cursor data or both as a user input device data input by the client;

(c) the control circuit transferring the client-side application program and the server-side application program to the second and first communication controllers, respectively;

(d) the first communication controller receiving video data representing desktop images from the server via the emulated first mass storage device;

(e) the control circuit transferring the video data representing desktop images to the second communication controller;

(f) the second communication controller outputting the video data representing desktop images to the client via the emulated second mass storage device;

(g) the second communication controller receiving user input device data from the client via the emulated second mass storage device;

(h) the control circuit transferring the user input device data to the first communication controller; and (i) the first communication controller outputting the user input device data to the server via the emulated user input devices;

wherein the first communication controller transmits the user input device data in one direction and receives the video data representing desktop images in the opposite direction by emulating the at least one emulated user input device and the emulated first mass storage device.

22. The method of claim 21, wherein the memory further stores first and second auto-run files, the method further comprising:

(j) the control circuit transferring the first and second auto-run files to the first and second communication controllers, respectively;

(k) the first communication controller presenting the first auto-run file and the server-side application program on the first emulated CD-ROM device; and (l) the second communication controller presenting the second auto-run file and the client-side application program on the second emulated CD-ROM device, wherein steps (j) through (l) are performed before steps (d) through (i).

23. A server having functionality for being remotely controlled by a client, comprising:

a host communication controller;

a first communication controller connected to the host communication controller, the first communication controller emulating a first mass storage device and one or more user input devices complying with a predetermined communication protocol, the emulated user input devices providing keystroke data or cursor data or both as a user input device data input by the client, wherein the first communication controller transmits the user input device data in one direction and receives video data representing a desktop image of the server in the opposite direction by emulating the emulated user input devices and the emulated first mass storage device;

a second communication controller configured for connecting to the client, the second communication controller emulating a second mass storage device complying with the predetermined communication protocol for receiving the user input device data from the client and transferring the video data video data representing the desktop image of the server as bulk data to the client in a transport such that maximal bandwidth is available for the transport to improve bulk data transfer efficiency;

a control circuit being coupled to and controlling the first and second communication controller, the control circuit transferring data between the first and second communication controllers; and a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively.

24. A client having functionality for remotely controlling a server, comprising:
a host communication controller;
a first communication controller configured for connecting to the server, the first communication controller emulating a first mass storage device and one or more user input devices complying with a predetermined communication protocol, the emulated user input devices providing keystroke data or cursor data or both as a user input device data input by the client, wherein the first communication controller transmits the user input device data in one direction and receives video data representing a desktop image of the server in the opposite direction by emulating the emulated user input devices and the emulated first mass storage device;
a second communication controller connected to the host communication controller, the second communication controller emulating a second mass storage device complying with the predetermined communication protocol for receiving the user input device data from the client and transferring the video data representing the desktop image of the server as bulk data to the client in a transport such that maximal bandwidth is available for the transport to improve bulk data transfer efficiency;
a control circuit being coupled to and controlling the first and second communication controllers the control circuit transferring data between the first and second communication controllers; and
a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively.

25. A system for facilitating remote control of a server by a client, comprising:
a first communication controller configured for connecting to the server, the first communication controller enumerating a first mass storage device and one or more user input devices complying with a predetermined communication protocol, and transmitting a user input device data to control the server via the at least one enumerated user input device that provides keystroke data or cursor data or both as the user input device data input by the client, wherein the first communication controller transmits the user input device data in one direction and receives video data representing a desktop image of the server in the opposite direction by enumerating the at least one enumerated user input device and the enumerated first mass storage device;
a second communication controller configured for connecting to the client, the second communication controller enumerating a second mass storage device complying with the predetermined communication protocol for receiving the user input device data from the client;
a control circuit being coupled to and controlling the first and second communication controllers, the control circuit transferring the user input device data between the first and second communication controllers; and
a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively;
wherein the control circuit transfers the video data representing the desktop image to the second communication controller, the second communication controller outputs the video data representing the desktop image to the client via the enumerated second mass storage device, the second communication controller receives the user input device data from the client via the enumerated second mass storage device, the control circuit transfers the user input device data to the first communication controller, the first communication controller outputs the user input device data to the server via the at least one enumerated user input device.

26. A system for facilitating remote control of a server by a client, comprising:
a first communication controller configured for connecting to the server, the first communication controller enumerating a first mass storage device and one or more user input devices complying with a predetermined communication protocol, and transmitting a user input device data to control the server via the at least one enumerated user input device that provides keystroke data or cursor data or both as the user input device data input by the client, wherein the first communication controller transmits the user input device data in one direction and receives video data representing a desktop image of the server in the opposite direction by enumerating the at least one enumerated user input device and the enumerated first mass storage device;
a second communication controller configured for connecting to the client, the second communication controller enumerating a second mass storage device complying with the predetermined communication protocol for receiving the user input device data from the client;
a control circuit being coupled to and controlling the first and second communication controllers, the control circuit transferring the user input device data between the first and second communication controllers; and
a memory coupled to the control circuit, the memory storing a server-side application program and a client-side application program, the server-side application program and the client-side application program being different programs, wherein the control circuit transfers the server-side application program to the first communication controller and transfers the client-side application program to the second communication controller respectively;
wherein the server-side application program is configured to cause the server to transmit the video data representing the desktop image of the server to the enumerated first mass storage device and to receive the user input device data from the at least one enumerated user input device;
wherein the client-side application program is configured to cause the client to transmit the user input device data to the enumerated second mass storage device and to receive the video data representing the desktop image of the server from the enumerated second mass storage device.

\* \* \* \* \*